United States Patent [11] 3,607,770

[72] Inventor Jacob G. Rabatin
 Chardon, Ohio
[21] Appl. No. 780,928
[22] Filed Oct. 23, 1968
[45] Patented Sept. 21, 1971
[73] Assignee General Electric Company

[54] GASEOUS REACTION PROCESS FOR THE PRODUCTION OF RARE EARTH OXYHALIDE AND OXIDE LUMINESCENT MATERIALS
12 Claims, 1 Drawing Fig.

[52] U.S. Cl. .................................................. 252/301.4 R,
 23/21, 23/87
[51] Int. Cl. ..................................................... C09r 1/08,
 C22b 59/00, C01f 17/00
[50] Field of Search .......................................... 252/301.4;
 23/87, 15, 19, 21

[56] References Cited
UNITED STATES PATENTS
2,729,605 1/1956 Swindells ..................... 252/301.4
3,226,334 12/1965 Machida et al. ............... 252/301.4
3,322,682 5/1967 Thompson .................... 252/301.4

Primary Examiner—Robert D. Edmonds
Attorneys—Richard H. Burgess, Henry P. Truesdell, Frank L. Neuhauser, Oscar B. Waddell and Melvin M. Goldenberg ABSTRACT: A method for the production of well-formed crystals of oxyhalides including oxychlorides, oxybromides, and oxyiodides, and oxides, of yttrium and the rare earth metals, i.e., elements having atomic numbers 39 and 57 through 71. Particles of the oxide of the selected element are heated in an atmosphere containing enough of the selected hydrogen halide to cause conversion of the oxide to the oxyhalide and recrystallization of the oxyhalide. This recrystallized oxyhalide can be converted to the corresponding oxide as large, well-crystallized particles by pyrohydrolysis. Alternatively, the oxyhalide can be formed by initially firing the oxide particles as a mixture with the selected ammonium halide. By starting with rare earth activated oxides, the process of the invention produces luminescent materials which are useful for cathode-ray tube applications, in lamps, and in X-ray applications such as in image converter tubes and film intensifier screens.

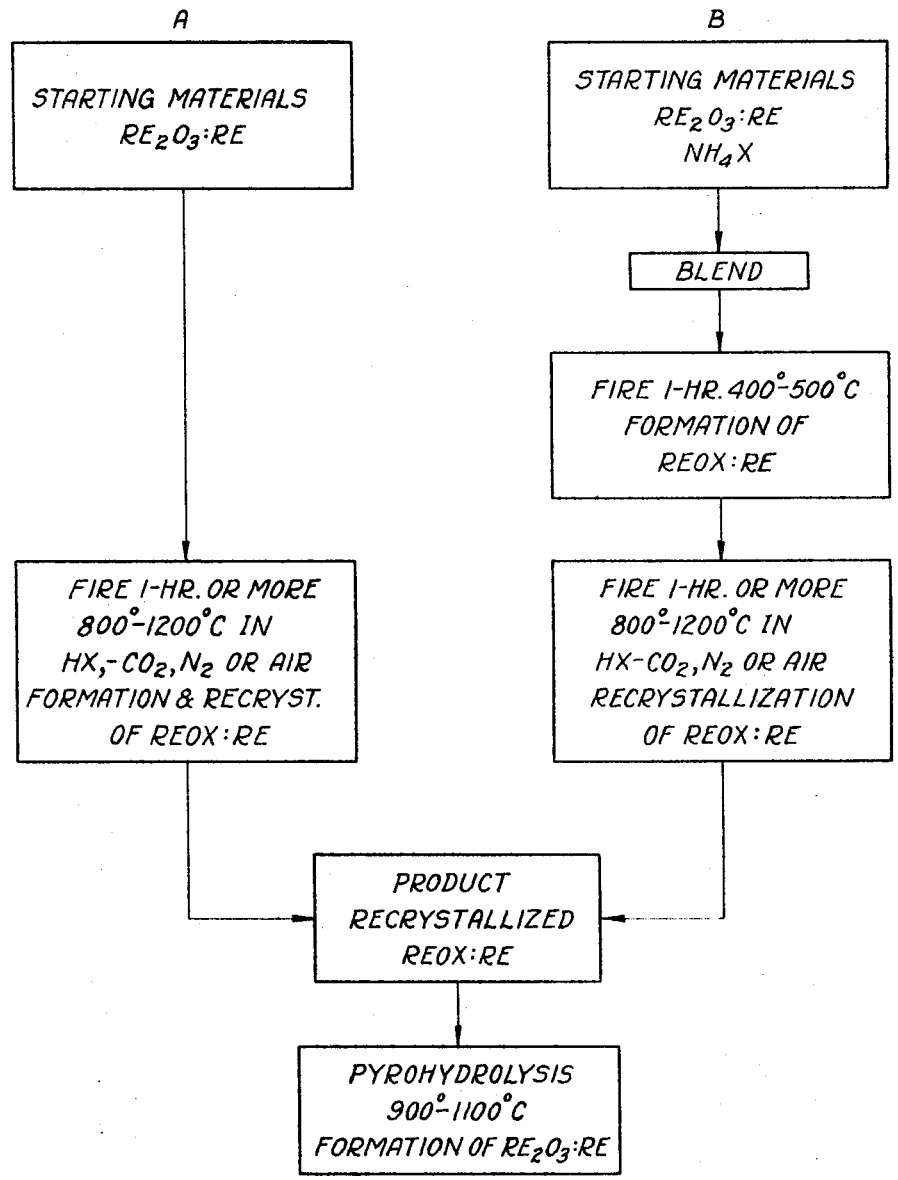

3,607,770

GASEOUS REACTION PROCESS FOR THE PRODUCTION OF RARE EARTH OXYHALIDE AND OXIDE LUMINESCENT MATERIALS

CROSS-REFERENCES TO RELATED APPLICATIONS

Phosphors for luminescent materials which can be made according to the process of the present invention are described and claimed in copending applications filed concurrently herewith and identified as LANTHANUM AND ADOLINIUM OXYHALIDE LUMINESCENT MATERIALS ACTIVATED WITH TERBIUM AND X-ray IMAGE converters UTILIZING THE SAME, Ser. No. 769,894, filed in the names of Jacob G. Rabatin and Robert A. Sieger, and LANTHANUM AND GADOLINIUM OXYBROMIDE LUMINESCENT MATERIALS ACTIVATED WITH ERBIUM, Ser. No. 769,860, and LANTHANUM AND GADOLINIUM OXYHALIDE LUMINESCENT MATERIALS ACTIVATED WITH DYSPROSIUM, Ser. No. 769,922, both filed in the name of Jacob G. Rabatin.

An alternative process for the production of these materials is described and claimed in the copending application filed concurrently herewith and identified as FUSED SALT PROCESS FOR PRODUCING RARE EARTH OXYHALIDE AND OXIDE LUMINESCENT MATERIALS, Ser. No. 769,940, filed in the name of Jacob G. Rabatin. All of these four copending applications are assigned to the assignee of the present application.

BACKGROUND OF THE INVENTION

The present invention relates to processes for producing well-formed crystals of rare earth and yttrium oxyhalides and oxides. More particularly, the invention also relates to processes for producing such materials which include activators that permit the materials to luminesce under appropriate excitation.

Methods used for preparation of these materials in the prior art have included the evaporation to dryness of the rare earth trihalides followed by heating or hydrolysis to obtain the corresponding oxyhalides. These methods have resulted in low efficiencies, apparently at least due in part to great difficulty in controlling the final purity of the oxyhalide material itself. Also, oxides produced by pyrohydrolysis of the corresponding oxyhalides will carry over certain of the good or bad luminescent characteristics of he oxyhalides.

For certain applications, it is desirable to have relatively large, well-formed crystalline particles of these oxyhalide and oxide materials. This is particularly so when the materials are doped with activators such as certain of the rare earth metals and used as x-ray-sensitive phosphors. There are not available in the art processes which are entirely suitable for the production of relatively large, well-formed crystalline particles of these materials, particularly for X-ray phosphor applications. Crystalline particles with sizes approaching 50 microns are particularly useful in X-ray image converter tubes and fluoroscopic screens.

SUMMARY OF THE INVENTION

Briefly stated, the present invention in certain of its embodiments provides a process for the production of well-formed crystals of at least one oxyhalide, selected from the group consisting of the oxychlorides, oxybromides and oxyiodides, of at least one of the elements having atomic numbers 39, and 57 through 71, comprising the following step: heating particles of the oxide of the selected element for at least about 1 hour at a temperature of at least about 800° C. in an atmosphere containing a sufficient proportion of the hydrogen halide of the selected oxyhalide to convert said oxide particles to oxyhalide particles, with the higher temperature firing in the hydrogen-halide-containing atmosphere and causing recyrstallization of the oxyhalide particles. Also, the recrystallized oxyhalide particles can be subjected to pyrohydrolysis to convert them to well-formed oxide particles, some of which are single crystals and others of which are polycrystalline. Both the recrystallized oxyhalide crystals and the oxide particles formed in accordance with the invention are relatively large, and particle sizes in the region of 3 to at least 30 microns average diameter can be achieved, and when desired much larger sizes can be made. The pyrohydrolysis is preferably performed in the temperature range of about 800° to 1,100° C.

The elements of which the oxides and oxyhalides are produced in accordance with the invention include element 39 which is yttrium, and elements 57 through 71 which are as follows: 57—LANTHANUM, 58—CERIUM, 59—PRASEODYMIUM, 60—NEODYMIUM, 61—promethium, 62—samarium, 63—europium, 64—gadolinium, 65—terbium, 66—dysprosium, 67—holmium, 68—erbium, 69—thulium, 70—ytterbium, and 71—lutetium.

The oxides and oxyhalides formed in accordance with the invention can also be produced in an activated state to permit luminescence upon appropriate excitation under X-ray, cathode ray, or ultraviolet radiation. The activators which may be used include cerium, praseodymium, neodymium, samarium, europium, terbium, dysprosium, holmium, erbium, and thulium.

Phosphors prepared according to the invention include preferably for some purposes the identified oxides and oxyhalides of lanthanum, gadolinium and yttrium. Particularly useful materials prepared in accordance with the invention include terbium-activated lanthanum oxybromide and terbium-activated lanthanum oxychloride.

It is an object of the present invention to provide a process for the production of improved crystalline particles of oxyhalides and oxides of the rare earth metals and yttrium.

BRIEF DESCRIPTION OF THE DRAWING

The sole FIGURE of the drawing is a flow diagram showing the steps of the two alternative routes of the invention with preferred temperatures and times and using rare earth activation. The final conversion of the recrystallized oxyhalide to oxide which is shown in the drawing is optional and is used only if the product desired is the oxide rather than the oxyhalide.

DESCRIPTION OF THE PREFERRED EMBODIMENTS

Processes of the invention are particularly desirable for the production of large well-formed crystals of the identified oxyhalides and oxides. In contrast to methods generally reported in the literature, materials produced in accordance with the invention can be readily formed essentially free of deleterious impurities and unwanted compounds, such as the rare earth trihalides and unwanted rare earth oxides mixed with the desired oxyhalide materials, while also being in the form of well-crystallized large particles.

The process of the invention will be described below in terms of production of yttrium oxychloride and yttrium oxide, each activated with europium, known as YOC1:Eu and $Y_2O_3$:Eu. Analogous processes are used to make the oxyhalides of the other selected elements of the invention and the other oxyhalides of yttrium, with activators being added as appropriate, preferably in the oxalate precipitation step. The starting materials for the processes of the invention can be made as described in the two following paragraphs, or they can be made by other methods known in the art.

Preferably, the oxides of yttrium and europium are slurried in water, then dissolved by addition of $HNO_3$ and boiling for several minutes. The solution is then cooled to about 50° to 60° C., and oxalic acid is added in amounts such as 120 to 200 percent of the stoichiometric amount, and the reaction mixture is stirred for about 5 minutes, during which time the oxalates of yttrium and europium are coprecipitated. The mixture is then allowed to cool and coprecipitated oxalates are removed by filtration without washing. The oxalate is dried at 100° C., in air and then fired to the oxide in air for 1 hour at about 1,100 C. Fused silica boats and firing tubes are used. This gives the mixed yttrium oxide and europium activator in a form suitable for use in production of the yttrium oxyhalide or oxide luminescent material.

More specifically, 10.80 grams of 99.9 percent $Y_2O_3$ are dissolved with 0.79 grams of 99.9 percent $Eu_2O_3$, coprecipitated, dried and fired to the oxides as described above for the production of YOCl:0.045Eu which can then be converted to $Y_2O_3$:0.09Eu.

Using the mixed oxides of the above-described oxalate coprecipitation and firing process, the process of the invention can be performed as follows: the mixed oxides are blended with ammonium chloride. The materials are then fired for a time such as 1 hour in a temperature range preferably of 400° to 500° C. to form the yttrium oxychloride activated with europium. This material is then recrystallized by firing for at least 1 hour at a temperature preferably in the range of 800° to 1,200° C. in HCl mixed with a carrier gas of air or $N_1$ or $CO_2$. When HBr is sued to form the oxybromides, the HBr is preferably mixed with $N_2$. For the production of $Gd_2O_3$ from GdOCl according to the invention, the atmosphere in this firing should be slightly oxidizing. Pyrohydrolysis to form $RE_2O_3$: RE is done in the temperature range of 900°–1100° C.

Alternatively, the $NH_4CL$ may be omitted and the yttrium oxide activated with europium fired directly in the HCl-containing atmosphere for formation and recrystallization of the luminescent material in the same step.

More specifically, the process which does not utilize the ammonium halide addition to the starting materials may be performed as follows: 10 grams of $Y_2O_3$ containing 4.5 mole percent $Eu_2O_3$ are placed in an open boat which is then placed in a 1½-inch inside diameter tube furnace and fired 1½hours at 1,100° C. in a flowing atmosphere of 300 cubic centimeters per minute HCl and 200 cubic centimeters per minute of $CO_2$. When this process was used, after cooling, microscopic examination revealed YOCl:Eu single-crystal particles of about 10 microns average diameter, while the oxide-starting materials had particle sizes of about 1 micron average diameter, as measured by a Coulter Counter. To convert this recrystallized oxyhalide phosphor to the corresponding oxide phosphor, 8 grams of this material are placed in an open boat and fired again in the tube furnace for 2½hours at 1,000° C. in a flowing atmosphere consisting of 400 cubic centimeters per minute of $CO_2$ passed through hot water. The resulting product was $Y_2O_3$:0.045$Eu_{23}$ of approximately the same particle size as the intermediate YOCl:Eu produced above.

The value of processes of the present invention is amply demonstrated by the fact that LaOBr:Tb phosphors made according to the present invention have been found to have radiant energy efficiencies of 15 percent or better under cathode ray excitation. This is at least as good as such efficiencies which have been found for ZnCdS:Ag phosphors in the prior art and is far better than has been found for any other oxygen-dominated phosphors. Earlier published attempts to make the same phosphor by methods of the prior art resulted in reported energy efficiencies of about 0.1 percent. Thus, the process of the invention can be used to produce luminescent materials which are greatly improved over those of the prior art, perhaps because of the possibilities of better chemical control and improved crystalline condition of the materials produced according to the invention.

In table I below, representative data are presented for oxychloride firing times and temperatures and the particle sizes (Coulter Counter) and cathode ray brightness in foot-lamberts of $Gd_2O_3$:0.035$Eu_{23}$ made according to the invention using starting materials comprising $NH_4Cl$ and $Gd_2O_3$: 0.035$Eu_2O_3$ fired from coprecipitated oxides. This composition is useful as the red phosphor for color television.

TABLE I

Particle Sizes and Brightnesses

| Sample No. | Oxychloride Firing Time (hr.) | Temp (°C.) | Oxide Particle Size (µ) | Brightness Ft. L. |
|---|---|---|---|---|
| 1 | 1 | 900 | 7.0 | 57.0 |
| 2 | 1 | 1,000 | 10.1 | 57.0 |
| 3 | 1 | 1,100 | 13.4 | 57.0 |
| 4 | 1 | 1,100 | 13.1 | 57.5 |
| 5 | 1 | 1,100 | 12.4 | 55.5 |
| 6 | 4 | 1,100 | 15.9 | 55.0 |
| 7 | 1 | 1,200 | 14.0 | 56.0 |
| 8 | 4 | 1,200 | 17.5 | 51.5 |

What I claim as new and desire to secure by Letters Patent of the United States is:

1. A process for the production of crystalline particles of at least one oxyhalide, selected from the group consisting of the oxychlorides, oxybromides and oxyiodides, of at least one of the elements having atomic numbers 39, and 57 through 71, comprising the following steps:

heating particles of the oxide of the selected element for at least about 1 hour at a temperature of at least about 800° C. in an atmosphere containing an inert or slightly oxidizing carrier gas in amounts sufficient to prevent the formation of the trihalide and containing a sufficient proportion of the hydrogen halide of the selected oxyhalide to convert said oxide particles to oxyhalide particles and to recrystallize said oxyhalide particles in the time and at the temperature used.

2. A process according to claim 1 in which the heating is performed within the temperature range of about 800° to about 1,200° C. in an atmosphere of the selected hydrogen halide mixed with a carrier gas selected from the group consisting of carbon dioxide, nitrogen and air.

3. A process according to claim 1 in which, prior to the step of claim 1:

said oxide particles are mixed with the ammonium halide whose halide is that of the selected oxyhalide and heated for at least about 1 hour at a temperature in the range of about 400° to 500° C. to convert said oxide particles to oxyhalide particles, and the step of claim 1 causes recrystallization of said oxyhalide particles.

4. A process according to claim 1 in which, subsequent to the step of claim 1:

said recrystallized oxyhalide particles are subjected to pyrohydrolysis to convert said oxyhalides to crystalline oxide particles.

5. A process according to claim 4 in which said pyrohydrolysis is performed in the temperature range of about 900° to 1,100° C.

6. A process according to claim 1 for the production of crystalline particles of luminescent materials wherein the oxyhalide also contains activator proportions of at least one element selected from the group consisting of Ce, Pr, Nd, Sm, Eu, Tb, Dy, Ho, Er, and Tm.

7. A process according to claim 3 for the production of crystalline particles of luminescent materials wherein the oxyhalide also contains activator proportions of at least one element selected from the group consisting of Ce, Pr, Nd, Sm, Eu, Tb, Dy, Ho, Er, and Tm.

8. A process according to claim 4 for the production of crystalline particles of luminescent materials wherein the oxyhalide also contains activator proportions of at least one element selected from the group consisting of Ce, Pr, Nd, Sm, Eu, Tb, Dy, Ho, Er, and Tm, activator proportions being carried over into said oxide crystals and causing said oxide crystals to be luminescent materials.

9. A process according to claim 1 in which said element is selected from the groups consisting of lanthanum, gadolinium, and yttrium.

10 A process according to claim 5 in which said luminescent material is terbium-activated lanthanum oxybromide.

11. A process according to claim 5 in which said luminescent material is terbium-activated lanthanum oxychloride.

12. A process according to claim 4 wherein the luminescent material produced is gadolinium oxide activated with europium, the gaodlinium oxyhalide selected is gadolinium oxychloride, the formation of the gadolinium oxychloride is performed for about 1 to 4 hours in the temperature range of 400° to 500° C., the recrystallization is performed for about 1 to 4 hours in the temperature range of about 800° to 1,200° C. under a slightly oxidizing atmosphere, and the pyrohydrolysis converts the gadolinium oxychloride activated with europium to gadolinium oxide activated with europium.